United States Patent
Tomar et al.

(10) Patent No.: US 11,347,696 B2
(45) Date of Patent: May 31, 2022

(54) SYSTEM FOR TRANSITION FROM A HIERARCHICAL FILE SYSTEM TO AN OBJECT STORE

(71) Applicant: Oracle International Corporation, Redwood Shores, CA (US)

(72) Inventors: Samarjeet Tomar, Bangalore (IN); Amit Roy, Bangalore (IN); Saurabh Manchanda, New Delhi (IN); Prasad V. Bagal, Saratoga, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 269 days.

(21) Appl. No.: 16/279,946

(22) Filed: Feb. 19, 2019

(65) Prior Publication Data

US 2020/0265023 A1 Aug. 20, 2020

(51) Int. Cl.
*G06F 16/18* (2019.01)
*G06F 16/185* (2019.01)

(52) U.S. Cl.
CPC ........ *G06F 16/1815* (2019.01); *G06F 16/185* (2019.01)

(58) Field of Classification Search
CPC .... G06F 16/1815; G06F 16/185; G06F 16/23; G06F 16/214; G06F 16/951
USPC ........................................................ 707/609
See application file for complete search history.

(56) References Cited

U.S. PATENT DOCUMENTS

| | | | |
|---|---|---|---|
| 9,020,987 B1* | 4/2015 | Nanda ................. | G06F 16/1734 707/821 |
| 2004/0167903 A1* | 8/2004 | Margolus ............ | G06F 16/2358 |
| 2013/0007097 A1* | 1/2013 | Sambe .................... | G06F 3/061 709/203 |
| 2014/0006465 A1* | 1/2014 | Davis .................... | G06F 16/183 707/827 |
| 2014/0279950 A1* | 9/2014 | Shapiro ................. | G06F 16/164 707/692 |
| 2015/0058382 A1* | 2/2015 | St. Laurent .......... | G06F 16/116 707/823 |
| 2015/0074168 A1* | 3/2015 | Hartman .............. | G06F 16/182 709/201 |

(Continued)

*Primary Examiner* — Hosain T Alam
*Assistant Examiner* — Nicholas E Allen
(74) *Attorney, Agent, or Firm* — Hickman Becker Bingham Ledesma LLP

(57) ABSTRACT

Techniques are provided for transitioning from a hierarchical file system to an object store. A request is received to change file metadata of a hierarchical file system. In response to the request: in-cache file metadata of the hierarchical file system is modified. The in-cache file metadata includes a directory structure of the hierarchical file system and file metadata of the hierarchical file system. Additionally, an in-store metadata journal entry is generated. The in-store metadata journal entry indicates an update to in-store file metadata. The in-store file metadata includes the directory structure of the hierarchical file system and file metadata of the hierarchical file system and is stored in an object store. The in-store metadata journal entry is stored in the object store. Furthermore, in-store file metadata and in-store metadata journal entry may be used to reconstruct the in-cache file metadata on another node.

22 Claims, 5 Drawing Sheets

(56) References Cited

U.S. PATENT DOCUMENTS

| | | | | |
|---|---|---|---|---|
| 2015/0220578 A1* | 8/2015 | Hunt | ............... | G06F 16/137 |
| | | | | 707/747 |
| 2016/0062694 A1* | 3/2016 | Makkar | ............ | G06F 3/064 |
| | | | | 711/111 |
| 2016/0179423 A1* | 6/2016 | Mizuno | ............ | G06F 3/0619 |
| | | | | 711/162 |
| 2016/0321291 A1* | 11/2016 | Malhotra | ........... | G06F 16/188 |
| 2016/0342486 A1* | 11/2016 | Kedem | ........... | G06F 11/1471 |
| 2017/0068469 A1* | 3/2017 | Shankar | .......... | G06F 3/0683 |
| 2017/0075781 A1* | 3/2017 | Bennett, Jr. | ......... | G06F 3/0619 |
| 2017/0091296 A1* | 3/2017 | Beard | ........... | G06F 16/258 |
| 2017/0235485 A1* | 8/2017 | Davis | ............ | G06F 3/0674 |
| | | | | 711/113 |
| 2017/0344560 A1* | 11/2017 | Talur | ............. | G06F 16/182 |
| 2018/0024853 A1* | 1/2018 | Warfield | ......... | G06F 9/45558 |
| | | | | 718/1 |
| 2018/0198765 A1* | 7/2018 | Maybee | ........... | G06F 3/067 |
| 2018/0205791 A1* | 7/2018 | Frank | ............ | H04L 67/1097 |
| 2018/0343019 A1* | 11/2018 | Xiang | ............ | H03M 13/1515 |
| 2018/0356989 A1* | 12/2018 | Meister | ......... | G06F 11/2064 |

* cited by examiner

SYSTEM FOR TRANSITION FROM A HIERARCHICAL FILE SYSTEM TO AN OBJECT STORE

FIELD OF THE INVENTION

The present invention relates to file systems and object stores and, more particularly, to allowing migration of data from a file system to an object store without changing applications dependent on the data.

BACKGROUND

Object store technology has become a preferred choice for certain classes of applications (apps) like multimedia servers (Netflix, Haystack), archiving and backup (S3 Glacier, Azure Archive), WORM storage (Spectrum Scale), and others. Legacy apps employing file-based access require intrusive modifications to leverage the benefits of an object store (OSt). It may not be possible for the user to incorporate these changes immediately.

Additionally, a hyperconverged system environment that is required to support application mobility must either make data available to all compute resources or choose to support data mobility. Object stores are a popular choice in such environments, but legacy applications cannot be made mobile because of their dependence on node-local data organized in a traditional, hierarchical file system.

Hence, a transition mechanism is preferred to allow movement of hierarchically organized file system (FS) data to a flat object store namespace. During and after the transition, an application should still be able to access data as if were organized in a hierarchical way.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
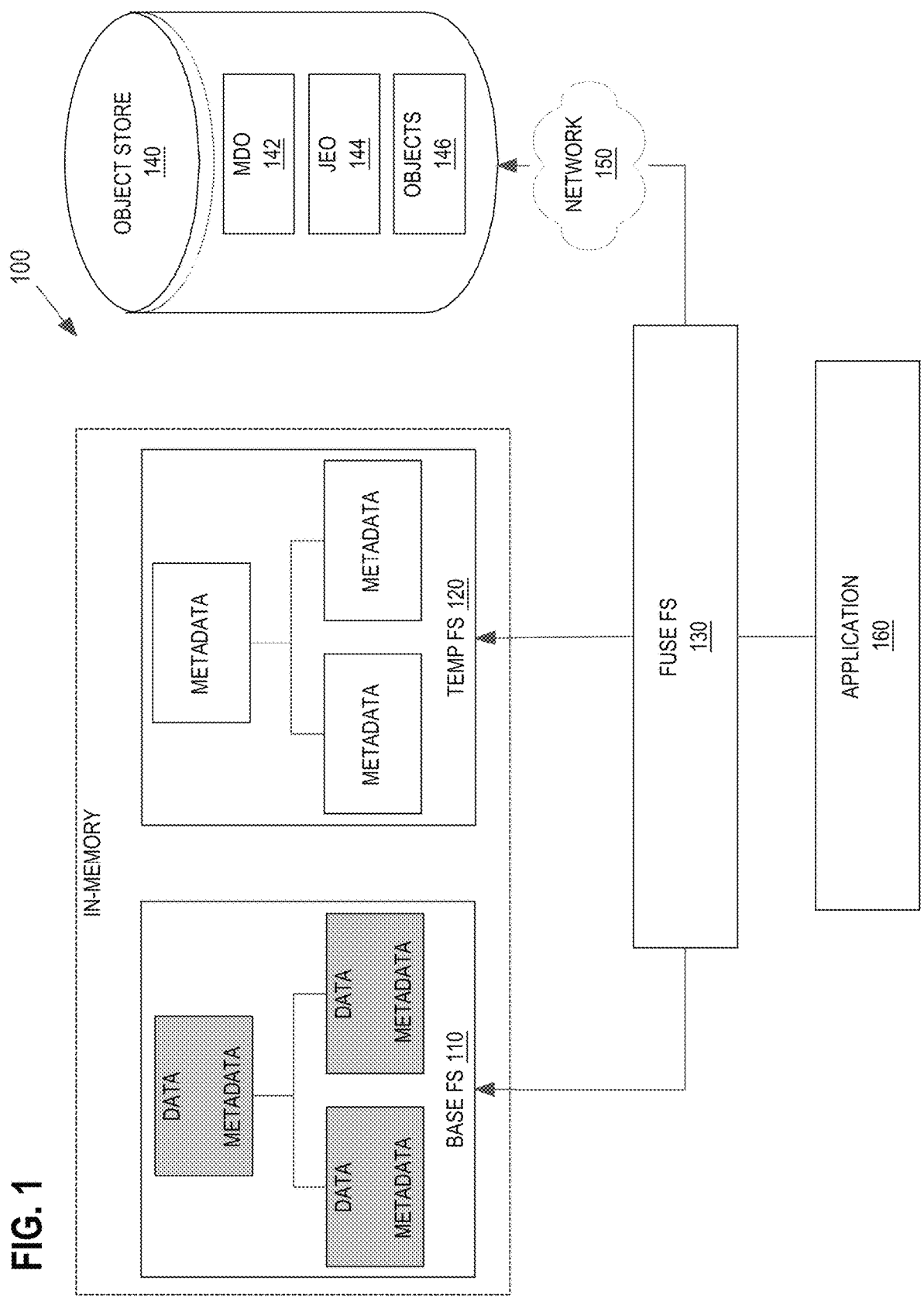
FIG. 1 is a block diagram that depicts an example system for a transition from a hierarchical file system to an object store.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for transitioning from a hierarchical file system to an object store. A system for transitioning includes a base file system that a user wishes to move to an object store, a temp file system that is a temporary directory used by the system to store file system metadata for directories and files, an intermediate file system, referred to herein as a fuse file system, that is used as the interface for accessing data after deployment of the system, and an object store to which the data from the base file system is migrated.

Before deployment of the system, all application requests are issued to the base file system. During initial deployment of the system, a mount command is issued by a user that links the base file system, temp file system, and fuse file system, and initiates a transfer of files from the base file system to the object store. Once the file systems are linked, all application requests to the base file system are directed through the fuse file system mount point.

During initial deployment, the temp file system is instantiated as a clone of the base file system, but without the actual files. That is, the temp file system on deployment includes metadata for the directories and files of the base file system, but not the actual file data. As each file is copied from the base file system to the object store, an identifier is assigned to the corresponding object in the object store and the identifier is stored as a metadata attribute with the corresponding directory in the temp file system.

When an application issues a request for a file while the files are being copied from the base file system to the object store, the fuse file system determines whether the file has been copied to the object store or if it only exists in the base file system. If the file has been copied to the object store, fuse file system directs the request to the object store. If the file has not been copied to the object store, the base file system is used to service the request.

Once the files are completely copied from the base file system to the object store, all application I/O requests for files are directed to the object store and the base copy of the data in the base file system is left untouched.

File system requests for metadata that do not modify metadata are implemented by the fuse file system by operating on the metadata in the temp file system. File system requests that modify metadata, such as the state of the file hierarchy, access checks, and/or file-lock acquisitions are executed on the temp file system. The actual changes to the metadata are applied on the temp file system and are propagated to the object store by storing a journal entry object in the object store that reflects the changes to the temp file system.

These techniques allow legacy applications configured for hierarchical file-based access to leverage the benefits of object store technology without requiring intrusive modifications. Additionally, these techniques allow for application mobility by folding the properties of a hierarchical file system into the object store, such that an application can still access the same hierarchy when run from a different node.

System Overview

FIG. 1 is a block diagram that depicts an example system for a transition from a hierarchical file system to an object store.

In FIG. 1 base FS 110 is a hierarchical file system that contains data that a user wants to relocate to the object store 140. A hierarchical file system is a hierarchy of directories that is used to organize files on a computer system. In base FS 110, resources such as data and/or files are organized according to a hierarchy referred to herein as a resource hierarchy. Each resource may be accessed, located, identified, or addressed by tracing a "path" through the hierarchy to the resource. Resources are stored in directories and for a given resource, a path begins at a root directory and proceeds down a hierarchy of directories to eventually arrive at the directory that contains the resource. The file system may associate more than one path with a resource.

Within a hierarchical file system, the sequence of file names in a given pathname begins with the name of the root directory, includes the names of all directories along the path from the root directory to the item of interest, and terminates in the name of the item of interest. Typically, the list of directories to traverse is concatenated together, with some kind of separator punctuation (e.g., '/', '\', or ';') to make a pathname. Example pathnames may include /Windows/Word/Example.doc or /VMS/App4/Example.doc.

At the very top of a hierarchical file system is a root directory, which contains all other directories on the system, inclusive of each directory's subdirectories. A mount point is a directory in a file system to which another file system is logically attached.

Hierarchical file systems such as base FS 110 store metadata associated with each piece of data and/or file within the file system. A hierarchical file system stores all the metadata associated with a file—including the file name, the length of the contents of a file, and the location of the file in the directory hierarchy—separate from the contents of the file. In an embodiment, a hierarchical file system stores the names of all the files in one directory in one place—the directory table for that directory—which is often stored like any other file. In another embodiment, a hierarchical file system stores only some of the metadata for a file in the directory table, and the rest of the metadata for that file is stored in a completely separate structure, such as an inode in the Linux Operating System.

Temp FS 120 is a temporary directory used by the system 100 to store the hierarchical file system metadata for directories and files. Temp FS 120 does not store actual file data, but serves to replicate the hierarchical structure of a hierarchical file system such as base FS 110 in conjunction with the metadata for such a hierarchical file system. On initial deployment of the system 100, temp FS 120 stores metadata such as the hierarchy of the base FS 110 file system. In an embodiment, temp FS 120 file system type is the same as the base FS 110 file system type. Metadata for Base FS 110 may be stored in-memory (e.g. volatile or non-volatile RAM) or stored in persistent storage (e.g. on-disk, flash), while file data of Base FS 110 may be stored in persistent storage. Temp FS 120 is stored in-memory (e.g. volatile or non-volatile RAM) on a client-side server or computing device or in persistent storage.

Fuse FS 130 is an intermediate file system that acts as a bridge or interface between application processes and an object store. Fuse FS 130 can be implemented as a kernel-level layered file system or a user-level file system such as File system in Userspace (FUSE). Fuse FS 130 exists on the client side and makes use of three directories/mount-points including fuse FS 130, temp FS 120, and base FS 110. Fuse FS 130 is a mount-point used by the apps for any file system operation after all data has been copied over from base FS 110 to the object store 140.

The Object Store 140 is the eventual storage for the data residing on base FS 110. The object store 140 may be implemented as cloud based storage accessible over network 150. An object store is a computer data storage architecture that manages data as objects. An object store utilizes a flat address space, called a storage pool. In an embodiment, object store 140 is pre-initialized with an account, a container, and access credentials, prior to the system deployment. The credentials are used by the system during an access such as a read or write. For each file in base FS 110, an independent object 146 is created and stored in object store 140 during migration.

Each object in an object store includes data, a globally unique identifier (GUID), and an expandable amount of metadata. The GUID is an address given to an object in order to find the object in object store. Storage system software associated with an object store uses the GUID assigned to the object to find and access any particular object.

Object store 140 stores metadata. The metadata includes attributes such as object size, access permissions, storage tier and date stored. The metadata extends the information stored with each object by adding application specific information. For example, application name, content format, user creating the object, or anything else that is relevant to the way in which the data is used could all be added as metadata.

A metadata object (MDO) is a representation of the file system hierarchy under the baseFS and the metadata of each file and directory under the baseFS. A MDO 142 is stored in the object store 140 and encapsulates information required to mount base FS 110 on the client-side in the same or a different node. At initial system 100 deployment, MDO 142 records the current hierarchy of base FS 110 under the mount-point, file-attributes such as the permission set, the ownership, information of any symbolic links, and any other relevant metadata that is required to reload the mountpoint. For example, given a file 'rec1' located at /baseFS/userT/admin/rec1, MDO 142 stores information including this exact path along with relevant attributes such as the aforementioned.

MDO 142 can be organized as a single object or a group of objects. For an application that infrequently modifies the FS hierarchy, maintaining a single object is preferable. For apps that frequently alter FS hierarchy, a group of objects each storing a subset of the complete tree is more suitable to handle concurrent updates efficiently. A more sophisticated implementation partitions the hierarchy dynamically to balance the access load across the set of MDO objects.

According to an embodiment, Object storage 140 is a replace-only object store. A replace-only object store does not provide the ability to incrementally edit one part of a file. Objects have to be manipulated as a whole unit, requiring the entire object to be accessed, updated, then re-written in their entirety. This is also true for MDO 142, requiring the entire metadata object to be accessed, updated, then re-written in order to update it.

In an embodiment, MDO 142 data structure can be implemented using a Left-Child-Right-Sibling Tree. The root of the tree is the mount point of the system, fuse FS. Each node of the tree represents either a file or a directory within fuse FS. Each node has two pointers—a child pointer and a sibling pointer. The child pointer for a directory node is a reference to the first of its direct children in some pre-defined order, e.g. lexicographical. All file nodes include a NULL child pointer. The sibling pointer refers to the child file/directory node, next in order, under the same parent. Each node encapsulates satellite data like the permission-set, the ownership, the GUID, etc.

A journal entry object (JEO) 144 is a finite number of garbage collected, sequenced set of objects created to update the MDO 142. A JEO 144 is created on any attribute-related or hierarchical change required by the user. Such a set of JEOs 144 along with the most-recent MDO 142 can be used to build the temp FS 120 hierarchy.

Because the MDO 142 of the object store cannot be appended to or modified in-place, the JEO 144 makes writes to large size MDOs more efficient. Additionally, JEOs also make concurrent metadata modifying operations on fuse FS 130 possible. For instance, an operation that alters the permission set of a file in temp FS would need to update the MDO 142 to reflect the current state of temp FS 120. In absence of JEOs, it would be required to fetch the current MDO 142, either fully or a part, from the object store, modify the required file's attribute within the MDO 142 to reflect the change, and write the MDO 142 back to the object store 140. During the course of this operation, no application would be allowed to modify any attribute of the file hierarchy, thereby increasing the wait time of the applications. Alternatively, the updated MDO 142 can be generated at the client-side and then updated in the object store, but the latency-overhead of updating the MDO 142 still remains.

As an illustration of a JEO 144, consider an app updating the permission-set of a file at /fuseFS/app01/data/file1 from '0771' to '0777'. To maintain consistency in the system between the object store and temp FS 120, this change needs to be propagated to the object store and temp FS 120. Once the access permissions of the current application is verified, a JEO 144 payload is prepared and is assigned a name stamped with a monotonically increasing sequence number. The command is, then, executed on temp FS 120 and a JEO 144 is written to the object store. Once the write is successful, the application is notified.

JEOs 144 are garbage collected and may be used to update the MDO 142 periodically to reflect the current state of temp FS 120. As a consequence, the process also reduces the clutter by JEOs 144. Such a cleanup prepares the new MDO 142 at the client side using the current MDO 142 and JEOs 144, writes the MDO 142 to the object store and deletes all JEOs 144 that are now part of the most recent persisted MDO 142. Additionally, because the MDO 142 and the JEOs 144 in the object store reflect the current state of temp FS 120, the MDO 142 and the JEOs 144 can be used to reconstruct temp FS 120, for example, in case of failure. For example, temp FS 120 can be reconstructed in a directory different from the base FS either in the same node or on a different node. Once the contents under base FS 110, including both data and metadata, are completely transferred to the object store 140, the MDO 142 in combination with the JEOs encapsulate the current state of the file system. Hence these objects can be used to rebuild temp FS 120 on a different node that reflects the current configuration of the proposed system. This also enables a user to unload temp FS on the active node and load it on a new node. In a networked environment, this ability allows for seamless relocation of applications to their preferred node with minimal user involvement. Furthermore, unless there have been user-initiated changes to the hierarchy or file attributes, every mount would result in the same hierarchy with the same properties, irrespective of the number of mounts or the number of movements to a new node.

In an embodiment, if a threshold amount of JEOs 144 is identified in the object store, JEOs 144 are consolidated into an updated MDO 142 and the old JEOs 144 are removed from the object store. For example, if 50 JEOs 144 are identified in the object store 140, the JEOs 144 are combined with the current MDO 142 to generate an updated MDO 142 that reflects the current state of temp FS 120.

Additionally, because the MDO 142 and JEOs 144 reflect the current state of temp FS 120, a new MDO can be generated at the client side using the current state of temp FS 120. The new MDO is written to the object store 140 and all JEOs are deleted.

In an embodiment, network 150 represents one or more local networks, wide area networks, internetworks, or service provider networks. In some embodiments, network 150 represents the Internet.

Migrating Data to Object Store

During initial deployment of the system 100, a transfer is initiated of files under base FS 110 to the object store 140. This data relocation is processed in the background to allow user operations to begin as early as possible. The migration may be initiated by a user issuing a mount or similar command that sets up the required linkage among base FS 110, temp FS 120, and fuse FS 130 for the subsystem to function. The mount command also initiates a transfer of files under base FS 110 to the specified object store 140.

When the system is first deployed, the base FS 110 hierarchy is used to create an MDO 142. The directory structure including the hierarchy is also replicated on temp FS 120. Following a successful load, an application 160 is allowed to access data in the system 100 through the fuse FS 130 mount point while the data under base FS 110 is synchronized to the object store 140 in the background. Until synchronization completes, any file still not synchronized to the object store 140 is accessed from the local client FS, base FS 110. Once the synchronization completes, all file I/O is redirected to the object store 140.

As each file is copied in a background procedure from base FS 110 to the object store 140, the system 100 assigns a GUID to the object in the object store 140 and stores the GUID, for example, as an extended attribute with the corresponding directory in temp FS 120. Once relocated, files are accessed only from the object store 140 and the base copy of the file in base FS 110 is left untouched.

During migration, when an application 160 issues an I/O request for a file in the system 100 through the fuse FS 130 mount point, it is determined whether the corresponding file in temp FS 120 has a GUID as part of the metadata attribute for the requested directory. If the file in temp FS 120 does have a GUID, then the system 100 directs the request to the object store 140. If the directory in temp FS 120 does not have a GUID associated with the metadata for the requested directory, then the system directs the request to base FS 110. Once migration is completed, an application 160 can use fuse FS 130 in the same manner as base FS 110 was used prior to the migration.

Thus, the system provides the functionality to service I/O requests for client applications 160 while all of the data from base FS 110 has not yet been fully migrated to the object store 140.

Figure 2:
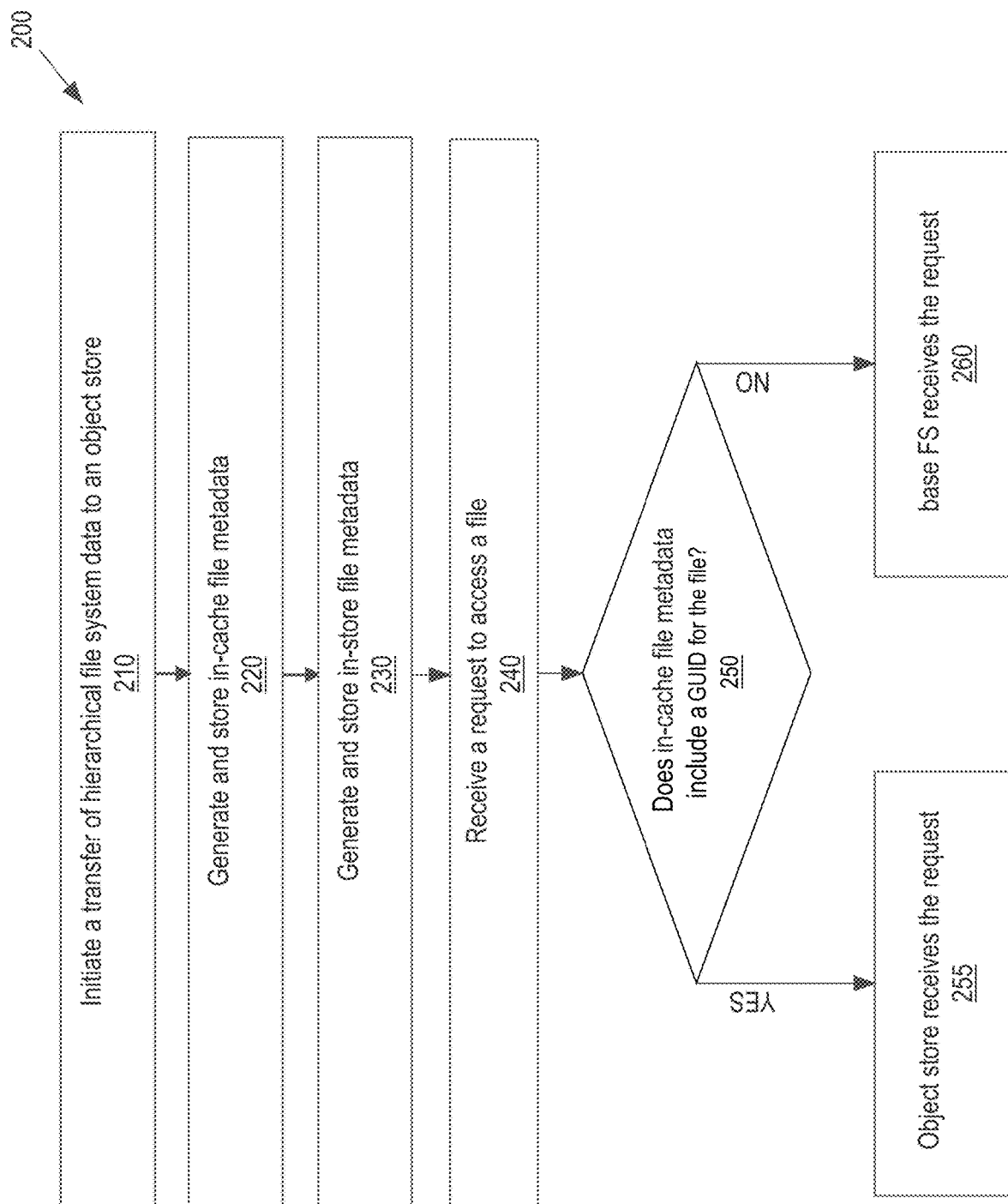
FIG. 2 is a flow diagram that depicts a procedure for migrating data to an object store in context of system 100.

FIG. 2 is a flow diagram that depicts a procedure 200 for migrating data to an object store in context of system 100 of FIG. 1, according to an embodiment of the invention.

At step 210, a transfer of hierarchical file system data to an object store is initiated. For example, a user issues a mount command to the system 100 that links base FS 110, temp FS 120, and fuse FS 130. The mount command also initiates a transfer of files under base FS 110 to the object store 140.

At step 220, in-cache file metadata is generated and stored. For example, metadata of base FS 110, including the directory structure and hierarchy of base FS 110, is replicated on temp FS 120. The in-cache file metadata, as described herein, is metadata that is stored in temp FS 120.

The in-cache file metadata is stored persistently in temp FS 120 so that any future metadata lookups can be performed minimal overhead.

At step 230, in-store file metadata is generated and stored. The in-store file metadata, as described herein, is an MDO 142 that is stored in the object store 140. For example, at initial deployment, MDO 142 is generated that records the hierarchy of base FS 110 under the mount-point, file-attributes such as the permission set, the ownership, information of any symbolic links, and any other relevant metadata that is required to reload the mountpoint. MDO 142 is stored in the object store 140.

At step 240, a request is received to access a file. For example, system 100 receives an I/O request for a file in the system 100 through the fuse FS 130 mount point.

At decision step 250, it is determined whether the in-cache file metadata includes a GUID for the file. For example, it is determined whether a file directory in temp FS 120 corresponding to the requested file includes a GUID as part of the metadata attribute for the file directory. If the file directory in temp FS 120 includes a GUID as part of the metadata attribute for the requested file, processing continues to block 255. Otherwise, processing continues to block 260.

At block 255, the object store receives the request. For example, if a file directory in temp FS 120 does have a GUID associated with the metadata for the requested file, then the system 100 directs the request to the object store 140.

At block 260, the hierarchical file system receives the request. For example, if a file directory in temp FS 120 does not have a GUID associated with the metadata for the requested file, then the system directs the request to base FS 110.

Modifying Data and Metadata

After migration, all file based I/O, including read and write operations, is directed to the object store 140 by fuse FS 130. For example, if a user issues an I/O request to modify the data of a file, fuse FS 130 directs the system call to the object store 140 to which the object is modified that the file corresponds to.

FS calls for metadata that do not modify metadata are implemented by fuse FS 130 by operating on the in-memory metadata in temp FS 120. This mechanism avoids any metadata fetch from the object store 140.

FS calls that modify metadata, such as the state of the file hierarchy, access checks, and/or file-lock acquisitions are executed on temp FS 120. The actual changes are then applied on temp FS 120 and are propagated to the object store 140 by embedding a JEO 144 in the object store 140 that reflects the changes to temp FS 120. The operation concludes by releasing any lock/s acquired on temp FS 120.

For example, if a user is trying to update the metadata of a file such as file access permissions or the ownership of the file, the temp FS 120 metadata of that particular file is updated. Then, a JEO 144 is constructed for that particular update, and the JEO 144 is sent to and stored in the object store 140. Once the JEO 144 has been written to the object store 140, the current state of temp FS 120 is the same as the current state of MDO 142 plus the list of JEOs 144 that are stored in the object store 140. Thus, using the MDO 142 and the list of the JEOs 144, the temp FS 120 hierarchy can be reconstructed in case of transitioning the system to a new node or system failure.

Figure 3:
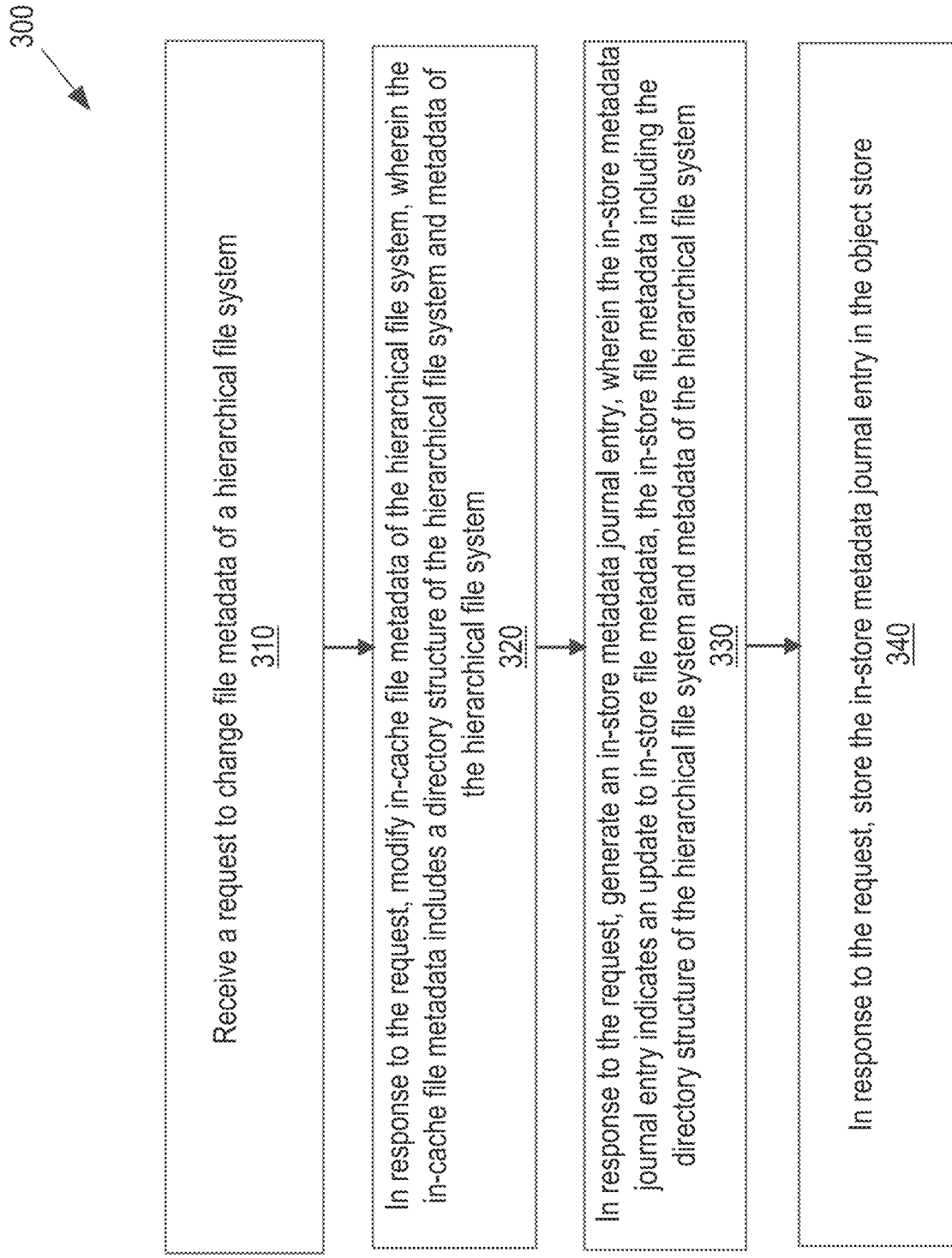
FIG. 3 is a flow diagram that depicts a procedure for modifying metadata in context of system 100.

FIG. 3 is a flow diagram that depicts a procedure 300 for modifying metadata in context of system 100 of FIG. 1, according to an embodiment of the invention.

At step 310, a request is received to change file metadata of a hierarchical file system. For example, fuse FS 130 receives a request from an application 160 to change file metadata of a hierarchical file system. File metadata, as described herein, is metadata that is stored in base FS 110 in association with hierarchical resources such as data and/or files.

At step 320, in response to the request received in step 310, in-cache file metadata of the hierarchical file system is modified. The in-cache file metadata, as described herein, is metadata that is stored in temp FS 120. In-cache file metadata includes a directory structure of the hierarchical file system of base FS 110 and the file metadata of the hierarchical file system of base FS 110.

At step 330, in response to the request received in step 310, an in-store metadata journal entry is generated. According to an embodiment, the in-store metadata journal entry, as described herein, is a JEO 144 that is stored in the object store 140. The in-store metadata journal entry indicates an update to in-store file metadata. The in-store metadata journal entry may specify what pieces of data and/or metadata that were modified in temp FS 120 and what the modification included. An in-store metadata journal entry is generated based on the modification to the in-cache file metadata in step 320.

The in-store file metadata includes the directory structure of the hierarchical file system and the file metadata of the hierarchical file system. The in-store file metadata, as described herein, is an MDO 142 that is stored in the object store 140. Updating the in-store file metadata requires a full re-write of the in-store file metadata, as discussed previously.

At step 340, the in-store metadata journal entry is stored in the object store 140.

Moving and Renaming Files

To execute a move or rename command, a rename or move command is executed on temp FS 120 and a JEO 144 is added to the object store 140 to reflect the update to temp FS 120.

As discussed previously, at the time of initial migration of base FS 110 data to the object store 140 or a new object creation in the object store 140, a GUID is created for each file and directory in temp FS 120. The GUID is associated with the filename using any preferred technique, such as adding the GUID to the metadata associated with the directory. The GUID is also persisted as part of the MDO 142. An object corresponding to this file is created/accessed via a name that includes the GUID. Hence, the file is accessible using the same GUID throughout its life irrespective of its location in temp FS 120. Thus, all that is required for a rename or move command is to add a JEO 144 to the object store 140 and execute the rename or move command on temp FS 120.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Memory Overview

As used herein, "non-volatile" refers to a characteristic of a memory that retains data in the absence of any form of electrical power, including external or battery backup. Examples of non-volatile memory include e-prom memory, flash memory, and disk memory. Volatile memory refers to a characteristic of a memory for which power is retained by a battery backup in the absence of another external power source. For example, volatile memory coupled to a board with an embedded battery-backup is not non-volatile memory, because without the power provided by a battery, the volatile memory does not retain data.

Byte-addressable memory is distinguishable from block-addressable memory. A byte is eight bits and is the minimum amount of data that may be addressed, retrieved from memory, or written to in byte-addressable memory. Thus, to manipulate a bit in a byte, a byte containing the bit must be fetched to a register of processor executing a machine instruction that references the byte (or word containing the byte) and manipulated according to the machine instruction or another machine instruction.

In contrast, the minimum size for a unit of block-addressable memory is a data block. A data block comprises multiple bytes and multiple words and cannot be entirely stored within a register of processor. For block-addressable memory, a data block is the minimum amount of data that may be addressed, retrieved from memory, or written to memory. Examples of block-addressable memory include flash memory and disk memory. To manipulate a bit or a byte in a block, a block containing those bits is loaded into a byte-addressable memory by an instruction referencing the block issued to a block-based interface.

RAM is distinguishable from read-only memory (ROM) in that data in RAM can be overwritten. As used herein, overwriting data refers to replacing the data with new data without first having to erase the data in the memory. Thus, as used herein, RAM refers to byte-addressable memory that can be overwritten.

Implementation Mechanisms—Software Overview

Figure 4:
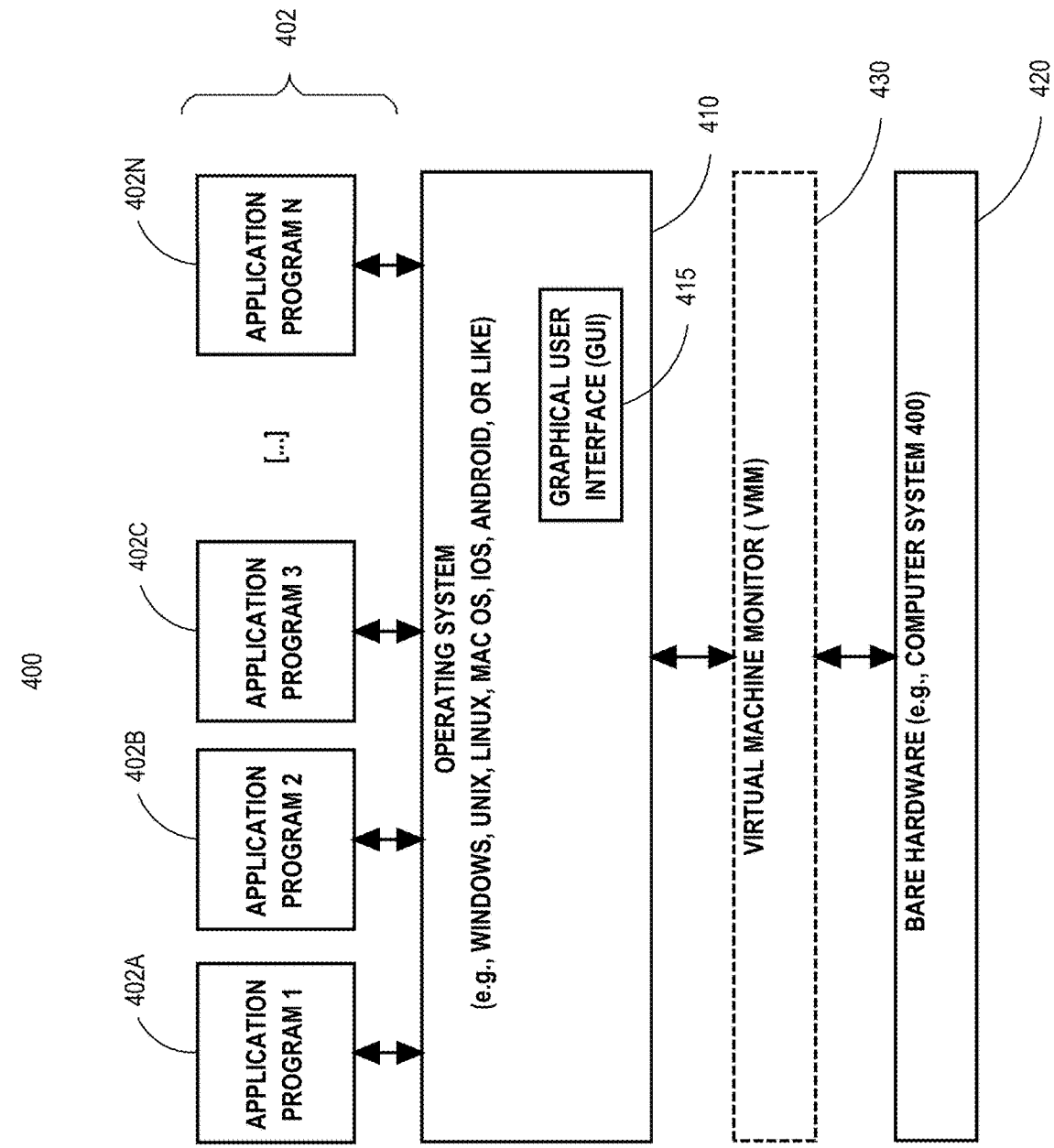
FIG. 4 is a block diagram depicting a software system upon which an embodiment of the invention may be implemented.
Figure 5:
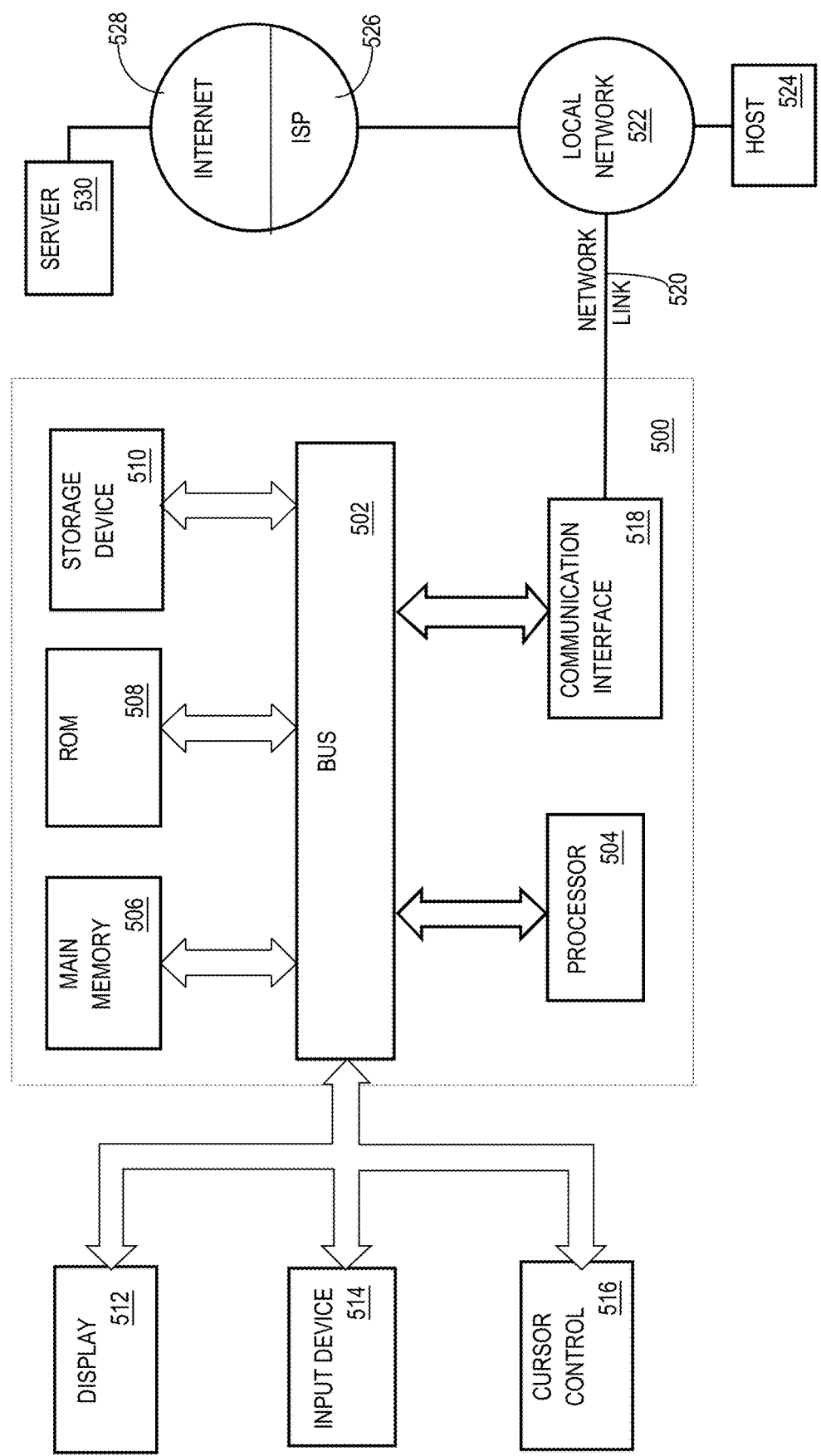
FIG. 5 is a block diagram that illustrates a computer system upon which an embodiment of the invention may be implemented.

FIG. 4 is a block diagram of a basic software system 400 that may be employed for controlling the operation of computing system 500 of FIG. 5. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 500. Software system 400, which may be stored in system memory (RAM) 506 and on fixed storage (e.g., hard disk or flash memory) 510, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 510 into memory 506) for execution by the system 400. The applications or other software intended for use on computer system 500 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 600 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 504) of computer system 500. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 500.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 500 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Implementation Mechanisms—Hardware Overview

Referring now to FIG. 5, it is a block diagram that illustrates a computing device 500 in which the example embodiment(s) of the present invention may be embodied. Computing device 500 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor.

Main memory 506, such as a random access memory (RAM) or other dynamic storage device, also may be coupled to bus 502 for storing information and software instructions to be executed by processor(s) 504. Main memory 506 also may be used for storing temporary variables or other intermediate information during execution of software instructions to be executed by processor(s) 504.

Software instructions, when stored in storage media accessible to processor(s) 504, render computing device 500 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and software instructions for processor(s) 504.

One or more mass storage devices 510 may be coupled to bus 502 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (i.e., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such software instructions may be read into main memory 506 from another storage medium, such as storage device(s) 510. Execution of the software instructions contained in main memory 506 cause processor(s) 504 to perform the functions of the example embodiment(s).

While functions and operations of the example embodiment(s) may be implemented entirely with software instructions, hard-wired or programmable circuitry of computing device 500 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or electromagnetic waves, such as those generated during radio-wave and infra-red data communications.

Various forms of media may be involved in carrying one or more sequences of one or more software instructions to processor(s) 504 for execution. For example, the software instructions may initially be carried on a magnetic disk or solid-state drive of a remote computer. The remote computer can load the software instructions into its dynamic memory and send the software instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the software instructions. The software instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution.

Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
storing in-store file metadata as one or more replace-only objects in an object store, the in-store file metadata including a directory structure of a hierarchical file system and file metadata of the hierarchical file system;
wherein updating the in-store file metadata requires a full re-write of the in-store file metadata;
receiving a request to change the file metadata of the hierarchical file system; and
in response to the request:
modifying in-cache file metadata of the hierarchical file system, wherein the in-cache file metadata includes the directory structure of the hierarchical file system and the file metadata of the hierarchical file system;

generating an in-store metadata journal entry, wherein the in-store metadata journal entry indicates an update to the in-store file metadata; and storing the in-store metadata journal entry as one or more replace-only objects in the object store.

2. The method of claim 1, wherein the in-cache file metadata does not store file data of the hierarchical file system.

3. The method of claim 1, wherein the in-cache file metadata stores a globally unique identifier (GUID) for each file of the hierarchical file system that has successfully been copied to the object store.

4. The method of claim 1, wherein the object store stores a GUID for each object in the object store.

5. The method of claim 1, wherein the in-cache file metadata is stored in-memory or on disk on a client-side server.

6. The method of claim 1, wherein the hierarchical file system is stored in-memory on a client-side server.

7. The method of claim 1, further comprising;
receiving an I/O request for a file;
in response to the request, determining that the in-cache file metadata includes a GUID that corresponds to the file; and
directing the request to the object store.

8. The method of claim 1, further comprising;
receiving an I/O request for a file;
in response to the request, determining that the in-cache file metadata does not include a GUID that corresponds to the file; and
directing the request to the hierarchical file system.

9. The method of claim 1, further comprising;
receiving a request to access file metadata of the hierarchical file system; and
responding to the request by accessing the in-cache file metadata.

10. The method of claim 1, further comprising;
receiving a request to move or rename a file of the hierarchical file system;
in response to the request:
modifying the in-cache file metadata of the hierarchical file system;
generating a particular in-store metadata journal entry; and
storing the particular in-store metadata journal entry in the object store.

11. The method of claim 1, wherein the in-cache file metadata is stored on a first host node, further comprising:
reconstructing the in-cache file metadata on a second host node based on the in-store file metadata and the in-store metadata journal entry.

12. A non-transitory computer-readable storage medium storing sequences of instructions that, when executed by one or more processors, cause:
storing in-store file metadata as one or more replace-only objects in an object store, the in-store file metadata including a directory structure of a hierarchical file system and file metadata of the hierarchical file system;
wherein updating the in-store file metadata requires a full re-write of the in-store file metadata;
receiving a request to change the file metadata of the hierarchical file system; and
in response to the request:
modifying in-cache file metadata of the hierarchical file system, wherein the in-cache file metadata includes the directory structure of the hierarchical file system and the file metadata of the hierarchical file system;
generating an in-store metadata journal entry, wherein the in-store metadata journal entry indicates an update to the in-store file metadata; and
storing the in-store metadata journal entry as one or more replace-only objects in the object store.

13. The non-transitory computer-readable storage medium of claim 12, wherein the in-cache file metadata does not store file data of the hierarchical file system.

14. The non-transitory computer-readable storage medium of claim 12, wherein the in-cache file metadata stores a globally unique identifier (GUID) for each file of the hierarchical file system that has successfully been copied to the object store.

15. The non-transitory computer-readable storage medium of claim 12, wherein the object store stores a GUID for each object in the object store.

16. The non-transitory computer-readable storage medium of claim 12, wherein the in-cache file metadata is stored in-memory or on disk on a client-side server.

17. The non-transitory computer-readable storage medium of claim 12, wherein the hierarchical file system is stored in-memory on a client-side server.

18. The non-transitory computer-readable storage medium of claim 12, the sequences of instructions including instructions that, when executed by said one or more processors, cause:
receiving an I/O request for a file;
in response to the request, determining that the in-cache file metadata includes a GUID that corresponds to the file;
directing the request to the object store.

19. The non-transitory computer-readable storage medium of claim 12, the sequences of instructions including instructions that, when executed by said one or more processors, cause:
receiving an I/O request for a file;
in response to the request, determining that the in-cache file metadata does not include a GUID that corresponds to the file;
directing the request to the hierarchical file system.

20. The non-transitory computer-readable storage medium of claim 12, the sequences of instructions including instructions that, when executed by said one or more processors, cause:
receiving a request to access file metadata of the hierarchical file system;
responding to the request by accessing the in-cache file metadata.

21. The non-transitory computer-readable storage medium of claim 12, the sequences of instructions including instructions that, when executed by said one or more processors, cause: receiving a request to move or rename a file of the hierarchical file system;
in response to the request:
modifying the in-cache file metadata of the hierarchical file system;
generating a particular in-store metadata journal entry;
storing the particular in-store metadata journal entry in the object store.

22. The non-transitory computer-readable storage medium of claim 12, wherein the in-cache file metadata is stored on a first host node; the sequences of instructions including instructions that, when executed by said one or more processors, cause:

reconstructing the in-cache file metadata on a second host node based on the in-store file metadata and the in-store metadata journal entry.

\* \* \* \* \*

UNITED STATES PATENT AND TRADEMARK OFFICE
CERTIFICATE OF CORRECTION

| | |
|---|---|
| PATENT NO. | : 11,347,696 B2 |
| APPLICATION NO. | : 16/279946 |
| DATED | : May 31, 2022 |
| INVENTOR(S) | : Tomar et al. |

It is certified that error appears in the above-identified patent and that said Letters Patent is hereby corrected as shown below:

In the Claims

In Column 15, Line 22, in Claim 7, delete "comprising;" and insert -- comprising: --, therefor.

In Column 15, Line 28, in Claim 8, delete "comprising;" and insert -- comprising: --, therefor.

In Column 15, Line 34, in Claim 9, delete "comprising;" and insert -- comprising: --, therefor.

Signed and Sealed this
Eighth Day of November, 2022

Katherine Kelly Vidal
*Director of the United States Patent and Trademark Office*